United States Patent [19]
Sayler

[11] 3,852,949
[45] Dec. 10, 1974

[54] PLURAL CYCLE DISPLAY DEVICE

[76] Inventor: Robert N. Sayler, 2440 Huntleigh, Oklahoma City, Okla. 73120

[22] Filed: June 8, 1973

[21] Appl. No.: 368,239

[52] U.S. Cl. .................. 58/2, 40/52 R, 273/161
[51] Int. Cl. ..... G04b 45/00, A63f 1/00, G04f 11/62
[58] Field of Search ...... 40/52 R; 46/243 R, 243 M; 58/1, 2, 3, 42.5, 127 R, 148-151; 273/161

[56] References Cited
UNITED STATES PATENTS

| | | | |
|---|---|---|---|
| 1,372,970 | 3/1921 | McDonnell | 58/149 |
| 3,024,590 | 3/1962 | Wynne | 58/125 C X |
| 3,232,038 | 2/1966 | Smith | 58/1 D X |
| 3,439,492 | 4/1969 | Gravenson | 58/50 R |
| 3,587,222 | 6/1971 | Mestrovic | 58/2 |

Primary Examiner—Edith Simmons Jackmon
Attorney, Agent, or Firm—Brown & Martin

[57] ABSTRACT

A device for displaying the relative position of several time based cyclic parameters. A clock rotated drive member engages individual beads in flexible chains to drive the beads in each of the chains an equal distance per unit of time. Individual beads are colored to indicate the position within a time based cycle.

7 Claims, 5 Drawing Figures

PATENTED DEC 10 1974 3,852,949

PLURAL CYCLE DISPLAY DEVICE

BACKGROUND OF THE INVENTION

Various devices have been proposed and built whereby a plurality of time based cycles may be computed or displayed. Several such devices have been built for display of the human biological cycles. These cycles are generally recognized as commencing at birth and result in the cyclical variation of physical, emotional, and intellectual parameters. The respective cycle duration for the three parameters are 23, 28, and 33 days. Prior art devices have utilized gearing and other elaborate mechanisms to display a representation of the sinusoidal variation in each of the three parameters. These devices have frequently required interpretation of the indication in order to make a determination as to whether or not a particular parameter was on the up side or down side of the cycle, and to relate the parameters, one to the other. Further, some such prior devices require computation and manipulation of the device on a daily basis in order to make the necessary calculations. An additional defect common to all prior art devices for displaying such cyclical variations is that the display is not adaptable to a simultaneous indication of the cyclical variations for a plurality of individuals on the same device.

It is therefore desirable to have a device that displays an indication for a number of individuals of their individual status in a plurality of timed based cycles. Such a device is particularly desirable where it is of simple construction and does not require any periodic manipulation in order to update the indication.

SUMMARY OF THE INVENTION

An exemplary embodiment of the instant invention overcomes the deficiencies attributed to prior art devices and produces a plural cycle display device which displays an indication of the position within a cycle for each of a plurality of cycles. For illustrative purposes, three cycles are utilized corresponding to the 23 day physical cycle, 28 day emotional cycle, and the 33 day intellectual cycle identified by biological cycle researchers.

In the principal embodiment, the cycles are displayed by indicia on flexible elongated members joined at their ends. The flexible member comprises a bead chain and the indicia is, advantageously, a colored bead at the appropriate position within the cycle. For example, in the 23 day physical cycle, there are a total of 23 beads and a colored bead is substituted for the conventional beads at a position corresponding to the then position of a particular individual in his 23 day cycle. If, for example, the individual was at the point where the sinusoidal curve crosses the ordinate from the high side toward the low side, then the bead would be placed at the uppermost portion of the device. The process is continued for the 28 and 33 day cycles. It is then possible to repeat the process and insert beads of a different color identifying a different individual and at the appropriate positions within the cycle.

The beads are carried over a drive member which is a substantially horizontal drive drum of generally square cross sectional configuration. The apexes of the square engage the spaces between the beads so as to provide a positive drive. The drum is carried on the output shaft of the clock motor and is driven to move a distance on the circumference of the drum which will result in a linear speed of the beads equal to one bead spacing per day. In this manner the revolutions of the drum will result, for example, in a complete revolution for the 23 bead cycle indicator in 23 days. As used herein, the term revolution is intended as including the movement of a hanging flexible elongated member through one complete turn of the member about an axis, despite the fact that that axis may be offset from the centroid of the flexible member.

The drum and motor are carried on a frame, which in the preferred exemplary embodiment comprises a vertical elongated transparent cylinder. By utilizing a transparent cylinder, it is possible to view all of the bead chains from the angle necessary to identify the positions of all of the individuals within their respective cycles. It is also possible to mark the transparent cylinder with an index mark or marks to clearly indicate the position of the beads within the chain. It may be desirable to divide the cylinder into left and right hand portions and utilize green and red colors to indicate the above and below the line portions of the sinusoidal variation.

It will be obvious that the invention is adaptable to the display of any time based cyclic parameter and is adaptable to displaying a substantially unlimited number of such cycles simultaneously by merely extending the drum and utilizing additional bead chains. It is to be understood that it is not necessary to utilize flexible bead chains, although they have particular advantages when utilized in the configuration of the invention. For some purposes, it may be desirable to use a circular indicating element of rigid construction.

In an alternative embodiment of the invention, the bead chains are positioned coaxially of one another. That is, the 28 day bead chain is positioned within the periphery of the 33 bead chain and the 23 bead chain is positioned within the periphery of the 28 bead chain. The bead chains are carried for co-planar movement along a base portion and are driven by a crank arm which rotates about an axis parallel to a radius of the common center for the bead chains. The crank moves through a hole in the base plate to engage a bead on each of the bead chains, and is so geared as to move through one complete revolution in 24 hours. In this manner, the three bead chains are advanced the same linear distance in the manner of the preferred exemplary embodiment. A cover plate holds the bead chains in position and cooperates with the crank arm to insure that the bead chains will be moved horizontally and will not move vertically out of contact with the crank arm.

It is therefore an object of the invention to provide a new and improved plural cycle display device.

It is another object of the invention to provide a new and improved plural cycle display device which is simple in construction.

It is another object of the invention to provide a new and improved plural cycle display device which requires no attention or maintenance after initial setup.

It is another object of the invention to provide a new and improved plural cycle display device which is easily read and interpreted.

It is another object of the invention to provide a new and improved plural cycle display device which is susceptible to the indication of a plurality of sinusoidal cycles simultaneously.

It is another object of the invention to provide a new and improved plural cycle display device which has a pleasing asthetic appearance.

It is another object of the invention to provide a new and improved plural cycle display device which is low in cost.

Other objects and many attendant advantages of the invention will become more apparent upon a reading of the following detailed description, together with the drawings in which like reference numerals refer to like parts throughout and in which.

Figures 1, 2, 3:
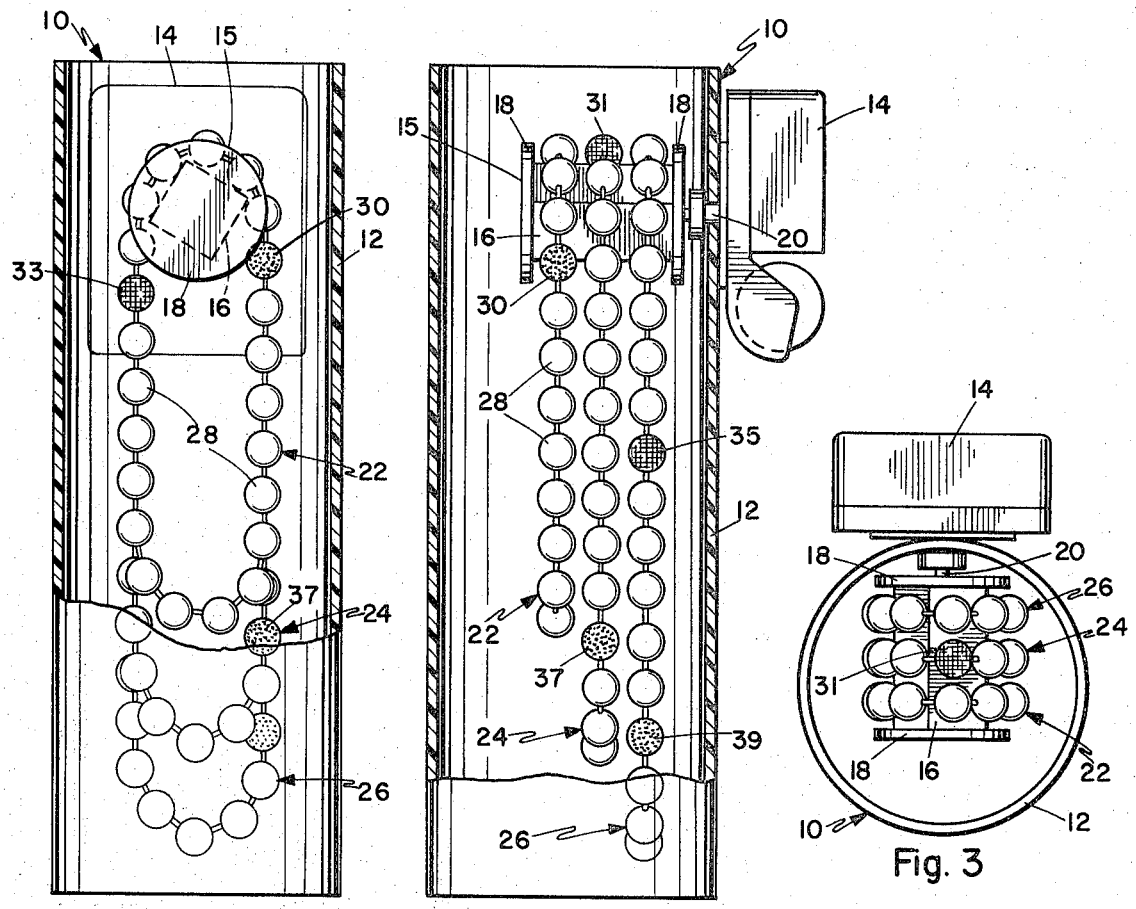
FIG. 1 is a front elevation view partially cut away of one form of the cycle display device.
FIG. 2 is a side elevation view partially cut away.
FIG. 3 is a top plan view of the structure of FIG. 1.

Referring now to FIGS. 1 through 3, the primary embodiment of the invention is illustrated. The display device 10 includes a clock motor 14 and a bead supporting and drive drum 15. The clock motor and drum are carried on a frame comprising a vertical transparent cylinder 12. Motor 14 is connected for driving the drum through shaft 20.

The bead strings 22, 24, and 26, comprising 23, 28, and 33 day cycle indicators respectively, are carried over the drum and are engaged by the rectangular drum portion 16. The end plates 18 on the drum 15 prevent lateral movement. As drum 16 rotates under the influence of the clock motor, the corners of the square drum configuration engage between the beads 28 and provide a positive drive for the bead chains. The output of the clock motor is regulated to produce a movement of one bead length in a 24 hour period.

In the use of the device as a display for biological cycles, an individual would compute his present position within the three biological cycles and place a distinctive colored bead in the bead chain at the corresponding place in each cycle. For example, if it was determined that the individual's 28 day emotional cycle was crossing the zero reference, then the individual would place colored bead 31 at the position illustrated, indicating that the emotional cycle was entering the phase below the line. Beads of the same color would be entered in appropriate positions in the 23 and 33 day cycles such as beads 33 and 35. Additional individuals using the display device would enter beads of a different color such as beads 30, 37, and 39.

Figures 4, 5:
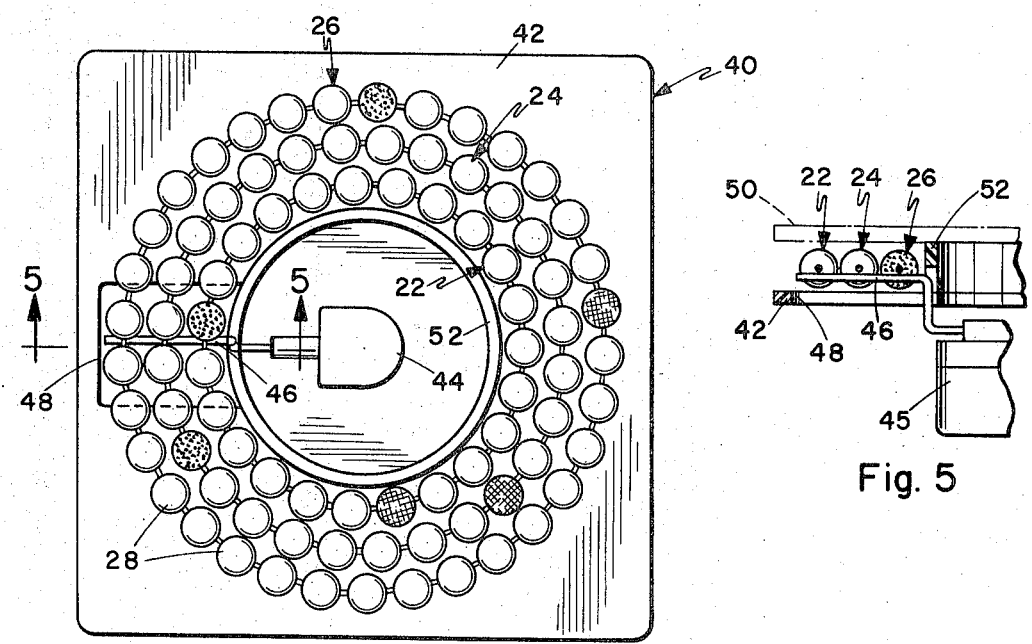
FIG. 4 is a top plan view of an alternative form of the display device.
FIG. 5 is a sectional view taken on line 5—5 of FIG. 4.

Referring now to FIGS. 4 and 5, the alternative embodiment of the invention is illustrated. In this embodiment, the bead chains 22, 24, and 26 are carried on a base plate 42 of the display device 40. A central core 52 restrains the beads to movement about a common axis. A gear drive 44 from a clock motor 45 drives a crank arm 46 which protrudes through a hole 48 in base plate 42 to engage the beads 28 on the several bead strings. The coaxial location for the bead strings is made possible by the difference in the number of beads being sufficiently great to produce a change in diameter at least equal to the width of the beads. Thus, the beads move over one another during the rotation and provide a continuous indication of the daily position of an individual within the three biological cycles. The crank arm 46 rotates once in 24 hours but engages the beads only during a fraction of that cycle so that it is desirable to time the clock to cause the major bead movement to take place approximately at midnight. The crank arm engages the beads and imparts a partially vertical and partially horizontal force to them. The vertical movement, responsive to the vertical force, is limited by a cover plate 50, indicated in broken line in FIG. 5, so that the beads are constrained to horizontal movement.

In the use of the alternative configuration for the invention, individuals desiring to track their position within the biological cycles insert distinctive colored beads in each of the three chains in a manner identical to that described in connection with FIGS. 1 through 3.

Having described my invention, I now claim:

1. A device for displaying the relative position of plural time-based cyclic parameters comprising:
    a frame,
    a motor mounted on said frame,
    a plurality of continuous elements supported for rotation about an axis transverse to the major plane of said continuous elements,
    each of said continuous elements comprising an elongated member joined at its ends and being divided into a plurality of segments substantially equal in length,
    a drive means driven by said motor for engaging said segments on each of said plurality of continuous elements and moving each of said segments an equal distance,
    said plurality of continuous elements being of a plurality of different lengths, said continuous elements differ in length by increments equal to said segments,
    at least one of said segments on each of said continuous elements being marked as indicia means for indicating the phase of a time-based cycle represented by said continuous elements.

2. The device according to claim 1 wherein:
    said elongated members are flexible,
    said drive means comprises a substantially horizontal drive drum for suspending and engaging said segments of said continuous elements.

3. The device according to claim 1 wherein:
    said elongated members are carried coaxially and in the same plane on said frame,
    said drive member comprises a crank arm having an axis of rotation along a radial to the axis of rotation of said flexible elongated members.

4. A device according to claim 1 wherein:
    said segments comprise beads carried on a continuous cord,
    said indicia means comprises differing colors for a plurality of said beads.

5. The device according to claim 4 wherein:
    said elongated members are carried coaxially and in the same plane on said frame, and
    said drive member comprises a crank arm having an axis of rotation along a radius to the axis of rotation of said flexible elongated members.

6. A device according to claim 3 wherein:
    said segments comprise beads carried on a continuous cord,
    said indicia means comprises differing colors for a plurality of said beads.

7. A device according to claim 5 wherein:
    said beads are supported between substantially planar plates,
    at least one of said plates is transparent.

* * * * *